US00RE45056E

(19) United States
(12) Reissued Patent
Yang et al.

(10) Patent Number: US RE45,056 E
(45) Date of Reissued Patent: Aug. 5, 2014

(54) COMMUNICATIONS HEADSET

(75) Inventors: Joseph Yang, San Jose, CA (US); Stann Sheperd, Santa Cruz, CA (US); John Ledingham, Scotts Valley, CA (US)

(73) Assignee: Plantronics, Inc., Santa Cruz, CA (US)

(21) Appl. No.: 29/399,920

(22) Filed: Aug. 19, 2011

Related U.S. Patent Documents

Reissue of:
(64) Patent No.: Des. 612,834
Issued: Mar. 30, 2010
Appl. No.: 29/329,592
Filed: Dec. 18, 2008

(51) LOC (10) Cl. ..... 14-01
(52) U.S. Cl.
USPC ..... D14/206
(58) Field of Classification Search
USPC ..... D14/206, 223, 225, 249, 142, 192, 188; 181/129, 130; 379/430, 431; 381/380, 381/381, 370, 375, 92; 455/569.1, 575.2, 455/90.2
See application file for complete search history.

(56) References Cited

U.S. PATENT DOCUMENTS

| | | | |
|---|---|---|---|
| D179,150 | S | 11/1956 | Norris |
| 3,633,705 | A | 1/1972 | Teder |
| 4,564,955 | A | 1/1986 | Birch et al. |
| 4,617,431 | A | 10/1986 | Scott et al. |
| 4,917,504 | A | 4/1990 | Scott et al. |
| D384,958 | S | 10/1997 | Shudo |
| 6,097,827 | A | 8/2000 | Yang |
| D439,890 | S | 4/2001 | Skulley et al. |
| D443,603 | S | 6/2001 | Taylor et al. |
| D447,472 | S | 9/2001 | McGugan |
| D447,734 | S | 9/2001 | Chuang |
| D447,743 | S | 9/2001 | Ma |
| D449,290 | S | 10/2001 | Taylor et al. |
| D452,857 | S | 1/2002 | Hong |
| D455,417 | S | 4/2002 | Bey et al. |
| D457,635 | S | 5/2002 | Dittli et al. |
| D458,247 | S | 6/2002 | Davies et al. |
| D463,784 | S | 10/2002 | Taylor et al. |
| D464,943 | S | 10/2002 | Lai |
| D464,951 | S | 10/2002 | Skulley et al. |
| D469,081 | S | 1/2003 | Perszyk et al. |
| D470,478 | S | 2/2003 | Kohli et al. |

(Continued)

OTHER PUBLICATIONS

Michael Valente, Maureen Valente & Karen Mispagel, Fitting Options for Adults Patients with Single Sided Deafness. Aug. 14, 2006, http://www.audiologyonline.com/articles/pf_article_detail.asp?article_id=1629.

(Continued)

*Primary Examiner* — Philip S Hyder

(57) CLAIM

The ornamental design for a communications headset, as shown and described.

DESCRIPTION

FIG. 1 is front-top-right perspective view of a communications headset showing our new design;
FIG. 2 is a front view thereof;
FIG. 3 is a back view thereof;
FIG. 4 is a left side view thereof;
FIG. 5 is a right side view thereof;
FIG. 6 is a top view thereof; and,
FIG. 7 is a bottom view thereof.
The broken lines showing of the unclaimed environment forms no part of the claimed design.

1 Claim, 3 Drawing Sheets

Figure 3:
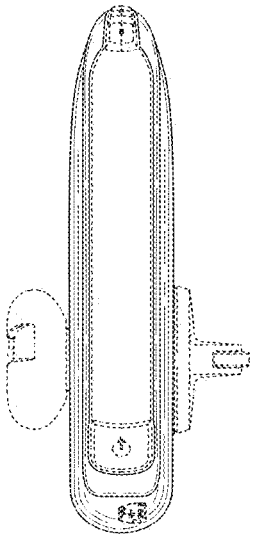

Matter enclosed in heavy brackets [ ] appears in the original patent but forms no part of this reissue; matter printed in italics indicates the additions made by reissue.

[Amended]

(56) References Cited

U.S. PATENT DOCUMENTS

| | | | | |
|---|---|---|---|---|
| D474,171 | S | | 5/2003 | Suzuki |
| D474,178 | S | | 5/2003 | Eroma |
| 6,560,346 | B2 | | 5/2003 | Ohta et al. |
| D476,645 | S | | 7/2003 | Padala et al. |
| D477,821 | S | | 7/2003 | Bieltvedt et al. |
| D480,072 | S | | 9/2003 | Ham |
| D490,398 | S | | 5/2004 | Gwee |
| D490,399 | S | | 5/2004 | Kamo et al. |
| 6,768,804 | B1 | | 7/2004 | Isvan |
| 6,771,790 | B2 | | 8/2004 | Liu |
| D504,419 | S | | 4/2005 | Bey et al. |
| D504,673 | S | | 5/2005 | Dyer et al. |
| D504,887 | S | | 5/2005 | Skulley |
| D505,413 | S | | 5/2005 | Skulley et al. |
| D506,462 | S | * | 6/2005 | Han et al. ..... D14/205 |
| D512,984 | S | | 12/2005 | Ham |
| D515,074 | S | * | 2/2006 | Jacobson et al. ..... D14/225 |
| D519,498 | S | * | 4/2006 | Ham ..... D14/225 |
| 7,089,042 | B2 | * | 8/2006 | Bodley ..... 455/569.1 |
| 7,106,873 | B1 | * | 9/2006 | Harrison et al. ..... 381/330 |
| D535,980 | S | * | 1/2007 | Bentley et al. ..... D14/225 |
| D537,815 | S | * | 3/2007 | Bentley et al. ..... D14/225 |
| D539,266 | S | | 3/2007 | Bentley et al. |
| D581,900 | S | * | 12/2008 | Caddes et al. ..... D14/206 |
| D584,719 | S | * | 1/2009 | Brennwald ..... D14/223 |

OTHER PUBLICATIONS

Sennheiser Communications. VMX 100 Headset Instruction Manual. May 2005. pp. 1, 6-17, 148. China.

* cited by examiner

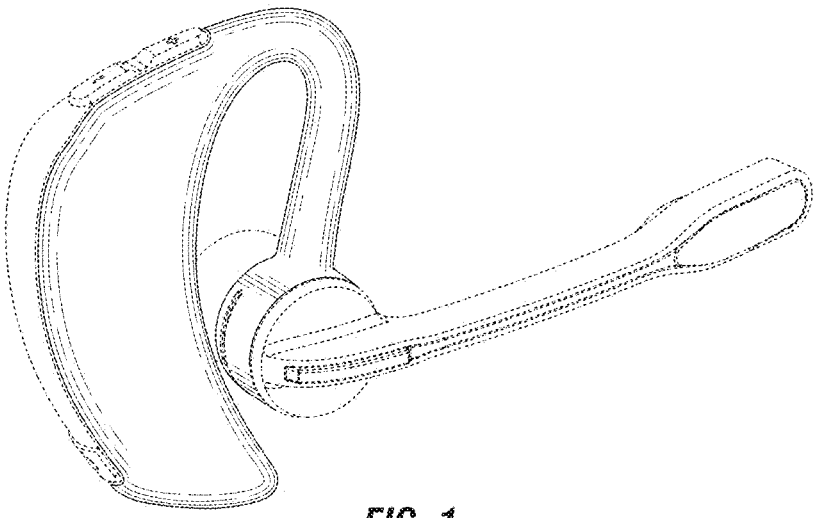
FIG. 1
[Amended]
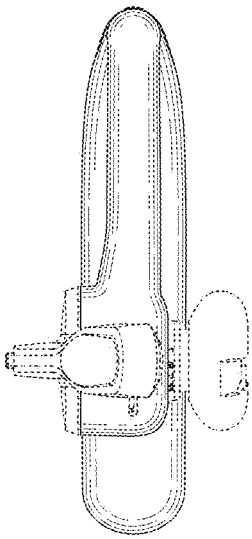
FIG. 2
[Amended]

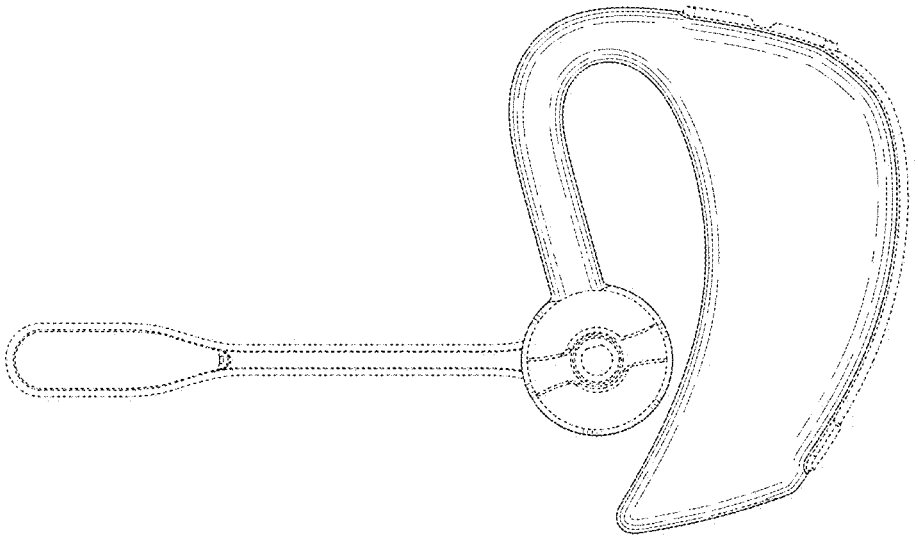
FIG. 4
[Amended]

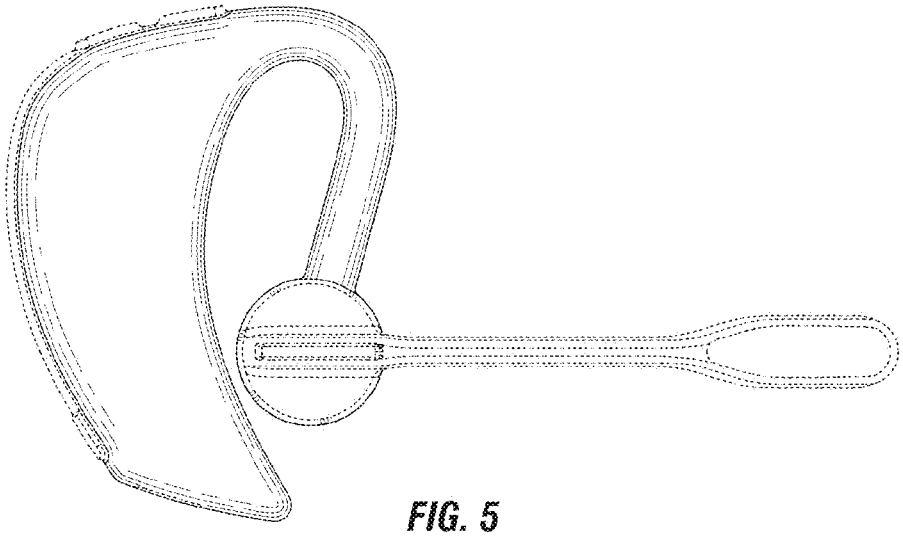
FIG. 5
[Amended]
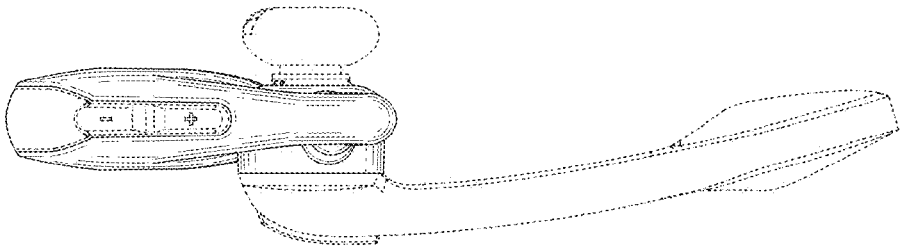
FIG. 6
[Amended]
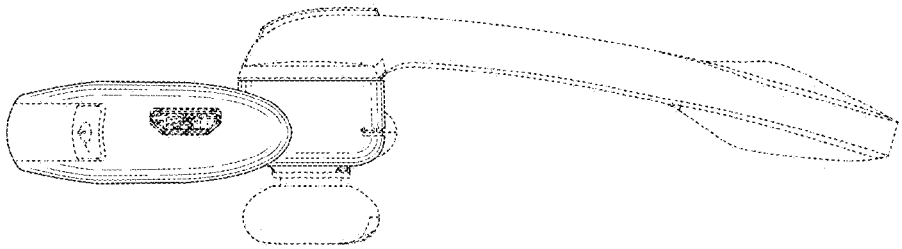
FIG. 7
[Amended]